(12) United States Patent
Li

(10) Patent No.: US 9,722,411 B2
(45) Date of Patent: Aug. 1, 2017

(54) SECONDARY POWER SYSTEM AND POWER SUPPLY DEVICE

(71) Applicant: BOE TECHNOLOGY GROUP CO., LTD., Beijing (CN)

(72) Inventor: Qingyong Li, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 386 days.

(21) Appl. No.: 14/550,024

(22) Filed: Nov. 21, 2014

(65) Prior Publication Data

US 2015/0364912 A1 Dec. 17, 2015

(30) Foreign Application Priority Data

Jun. 11, 2014 (CN) .......................... 2014 1 0257680

(51) Int. Cl.
*H02H 3/087* (2006.01)
*H02H 3/20* (2006.01)
*H02H 7/10* (2006.01)
*H02H 7/12* (2006.01)

(52) U.S. Cl.
CPC ............ *H02H 3/087* (2013.01); *H02H 3/202* (2013.01); *H02H 3/207* (2013.01); *H02H 7/1213* (2013.01); *Y10T 307/609* (2015.04)

(58) Field of Classification Search
None
See application file for complete search history.

(56) References Cited

U.S. PATENT DOCUMENTS

| 2009/0303648 A1* | 12/2009 | Benton | H02H 9/005 361/90 |
| 2010/0033887 A1* | 2/2010 | Fong | H02H 3/334 361/91.1 |
| 2012/0099355 A1* | 4/2012 | Xie | H02H 3/207 363/126 |

FOREIGN PATENT DOCUMENTS

| CN | 2225109 Y | 4/1996 |
| CN | 202475348 U | 10/2012 |

OTHER PUBLICATIONS

Office Action dated May 20, 2016 issued in corresponding to Chinese Application No. 201410257680.5.

(Continued)

*Primary Examiner* — Jared Fureman
*Assistant Examiner* — Aqeel Bukhari
(74) *Attorney, Agent, or Firm* — Nath, Goldberg & Meyer; Joshua B. Goldberg

(57) ABSTRACT

The present provides a secondary power system and a power supply device. The secondary power system is used for supplying power for a load equipment, and comprises: a fuse circuit, a filter circuit, a convertor circuit and an over-voltage and under-voltage protection circuit, wherein, the fuse circuit, the filter circuit, the over-voltage and under-voltage protection circuit and the convertor circuit are sequentially connected in series; the over-voltage and under-voltage protection circuit is configured to cut off power supplied to the convertor circuit when power supplied by the primary power source is an under-voltage or over-voltage; the convertor circuit is configured to convert the primary power source into a secondary power source. The secondary power system, by providing an over-voltage and under-voltage protection circuit, can not only lower the cost of the convertor circuit, but also save the space occupied by the convertor circuit.

20 Claims, 2 Drawing Sheets

(56) References Cited

OTHER PUBLICATIONS

Gutierrez, "Different Hot Swap Controller", May 2008.
Wang, et al., "Design of secondary power supply system for airborne equipments", Modern Electronics Technique, vol. 35, No. 20, Oct. 2012.
"Positive High Voltage Hot Swap/Inrush Current Controller with Power Limiting"; National Semiconductor Corporation; Sep. 2006; pp. 1-17.
Chen, Shouxian;"A Hot Swap Controller and its Application"; National Semiconductor Corporation; 2007.
Second Office Action dated Feb. 4, 2017 corresponding to Chinese application No. 201410257680.5.

* cited by examiner

SECONDARY POWER SYSTEM AND POWER SUPPLY DEVICE

FIELD OF THE INVENTION

The present invention relates to the technical field of power supply for load equipment, and in particularly, relates to a secondary power system and a power supply device.

BACKGROUND OF THE INVENTION

Electrical energy supplied to airborne equipment includes two types, i.e., alternating current (AC) and direct current (DC). Generally, AC power supply for airborne equipment is implemented by designing a secondary power system.

Secondary power systems for different airborne equipment differ greatly in design. FIG. 1 is a block diagram of a secondary power system for airborne equipment, and in the secondary power system, a primary power source that can provide 28V DC power is used to supply power for the secondary power system. The main circuit includes a fuse 5, a filter 6, a convertor 7 and the like. The function of the fuse 5 is providing safety protection, when an input current increases rapidly due to an abnormal condition such as over-voltage of the primary power supply, a short circuit occurring in a latter-stage load circuit, or the like, the fuse 5 is disconnected to ensure the safety of the primary power circuit as well as the convertor 7 and the latter-stage load circuit. The filter 6 is used for restraining interference from the primary power source and meanwhile for preventing the primary power source from being polluted by interference generated by the secondary power system. The convertor 7 is the core of the secondary power system, and converts 28V DC power input from the primary power source into a secondary power source required by the airborne equipment, such as various DC power with voltages of 12V, 5V, 3.3 V, 1.5V and the like.

In the above secondary power system, a specific design circuit of the convertor is shown in FIG. 2. The 28V DC power from the primary power source is connected to the convertor via the fuse and the filter. To meet the requirements on resistance to over-voltage surge in Standard GJB191-86, input filter capacitors (such as C1 and C2), a power control chip (such as TPS5450) and other elements in the convertor all need to have a withstand voltage over 80V; however, relatively high withstand voltage brings difficulty in selecting elements, and also results in increased volume of an element and increased cost.

SUMMARY OF THE INVENTION

In view of the above technical problems existing in the prior art, the present invention provides a secondary power system and a power supply device. The secondary power system, by setting an over-voltage and under-voltage protection circuit, can greatly decrease withstand voltages of some elements in a convertor circuit on the premise that the requirements on resistance to over-voltage surge in international standard are satisfied, thus increasing flexibility in selecting elements in the convertor circuit and decreasing volumes of the selectable elements significantly.

The present invention provides a secondary power system, which is used for supplying power for a load equipment, and comprises: a fuse circuit, a filter circuit, a convertor circuit and an over-voltage and under-voltage protection circuit, wherein the fuse circuit, the filter circuit, the over-voltage and under-voltage protection circuit and the convertor circuit are sequentially connected in series;

an input terminal of the fuse circuit is configured to be electrically connected to a primary power source, and the fuse circuit is capable of cutting off power supplied to a latter-stage circuit connected to an output terminal of the fuse circuit when an overcurrent occurs in the primary power source or the latter-stage circuit;

the filter circuit is configured to suppress influence on the secondary power system caused by noise of the primary power source, and to prevent interference generated by the secondary power system from entering the primary power source at the same time;

the over-voltage and under-voltage protection circuit is configured to cut off power supplied to the convertor circuit when power supplied by the primary power source is an under-voltage or over-voltage; and the convertor circuit is configured to convert a voltage provided by the primary power source into a voltage of a secondary power source required by the load equipment.

Preferably, the over-voltage and under-voltage protection circuit comprises an integrated sub-circuit and a peripheral sub-circuit connected with each other, the integrated sub-circuit comprises an over-voltage lockout pin, a under-voltage lockout pin and a gate driving pin, and the peripheral sub-circuit comprises a first resistor, a second resistor, a third resistor and a switch tube comprising a gate, a first electrode and a second electrode;

the first resistor, the second resistor and the third resistor are sequentially connected in series to form a resistor string, a terminal of the first resistor which is not connected in series is a first terminal of the resistor string, the first terminal is connected to an output terminal of the filter circuit, a terminal of the third resistor which is not connected in series is a second terminal of the resistor string, and the second terminal is grounded;

the under-voltage lockout pin of the integrated sub-circuit is connected to a connection point between the first resistor and the second resistor, the over-voltage lockout pin of the integrated sub-circuit is connected to a connection point between the second resistor and the third resistor; and the gate of the switch tube is connected to the gate driving pin of the integrated sub-circuit, the first electrode of the switch tube is connected to the output terminal of the filter circuit, and the second electrode of the switch tube serves as an output terminal of the over-voltage and under-voltage protection circuit.

Preferably, an over-voltage threshold $U_{OVL}$ of the secondary power system is calculated according to the following formula:

$$U_{OVL}=[(R1+R2)\times(2.5V/R3-21\ \mu A)]+2.5V,$$

and an under-voltage threshold $U_{UVH}$ of the secondary power system is calculated according to the following formula:

$$U_{UVH}=2.5V+[R1\times(21\ \mu A+2.5V/(R2+R3))],$$

wherein, R1 is the resistance of the first resistor, R2 is the resistance of the second resistor, R3 is the resistance of the third resistor, and the resistances of the first resistor, the second resistor and the third resistor are all adjustable.

Preferably, the peripheral sub-circuit further comprises a fourth resistor, the integrated sub-circuit further comprises a power input pin and a current sense pin, a first terminal of the fourth resistor is connected to the output terminal of the filter circuit and the power input pin of the integrated sub-circuit, and a second terminal of the fourth resistor is connected to the first electrode of the switch tube and the current sense pin of the integrated sub-circuit.

Preferably, the switch tube is a MOS transistor, and the integrated sub-circuit includes LM5069.

Preferably, a nominal fusing current of the fuse circuit is twice as large as a nominal working current of the latter-stage circuit connected to the output terminal thereof.

Preferably, the convertor circuit comprises a DC/DC convertor, the primary power source is used for providing 28V DC power, and the DC/DC convertor is configured to convert the 28V DC power into 12V DC power and/or 5V DC power.

Preferably, the DC/DC convertor uses potting encapsulation.

Preferably, the convertor circuit further comprises a low dropout linear regulator, which is connected in series with the DC/DC convertor, and is configured to convert the 5V DC power into 3.3V DC power and/or 1.5V DC power.

Preferably, the convertor circuit further comprises at least one relay protection unit, which is connected in series between the DC/DC convertor and the load equipment, and/or, connected in series between the DC/DC convertor and the low dropout linear regulator.

The present invention further provides a power supply device, which is used for supplying power to a load equipment, and comprises the above secondary power system.

The beneficial effects of the present invention are as follows: the secondary power system provided by the present invention, by setting an over-voltage and under-voltage protection circuit, can greatly decrease withstand voltages of some elements in a convertor circuit, on the premise that the requirements on resistance to over-voltage surge in international standard are satisfied, thus increasing flexibility in selecting elements in the convertor circuit and decreasing volumes of the selectable elements significantly, which not only lowers the cost of the convertor circuit, but also saves the space occupied by the convertor circuit.

The power supply device provided by the present invention can not only lower the cost of the power supply device, but also save the occupied space of the power supply device by using the above secondary power system.

DETAILED DESCRIPTION OF THE EMBODIMENTS

In order to enable a person skilled in the art to better understand the technical solutions of the present invention, a secondary power system and a power supply device will be described in more details below in conjunction with the accompanying drawings and specific embodiments.

Embodiment 1

Figure 3:
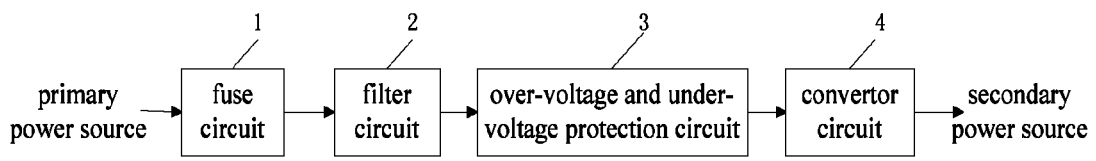
FIG. 3 is a block diagram of a secondary power system provided by Embodiment 1 of the present invention.

The present embodiment provides a secondary power system for supplying power for a load equipment, as shown in FIG. 3, the secondary power system comprises: a fuse circuit 1, a filter circuit 2, a convertor circuit 4 and an over-voltage and under-voltage protection circuit 3, and the fuse circuit 1, the filter circuit 2, the over-voltage and under-voltage protection circuit 3 and the convertor circuit 4 are sequentially connected in series.

An input terminal of the fuse circuit 1 is configured to be electrically connected to a primary power source, and the fuse circuit 1 can cut off power supplied to a latter-stage circuit connected to an output terminal of the fuse circuit 1 when an overcurrent occurs in the primary power source or the latter-stage circuit. In the present invention, the latter-stage circuit connected to the output terminal of the fuse circuit 1 may comprise the filter circuit 2, the over-voltage and under-voltage protection circuit 3, the convertor circuit 4, a load, and the like.

The filter circuit 2 is configured to suppress influence on the secondary power system caused by noise of the primary power source, and to prevent interference generated by the secondary power system from entering the primary power source at the same time.

The over-voltage and under-voltage protection circuit 3 is configured to cut off power supplied to the convertor circuit 4 when power supplied from the primary power source becomes an over-voltage or under-voltage.

The convertor circuit 4 is configured to convert a voltage provided by the primary power source into a voltage of a secondary power source required by the load equipment.

Figure 1:
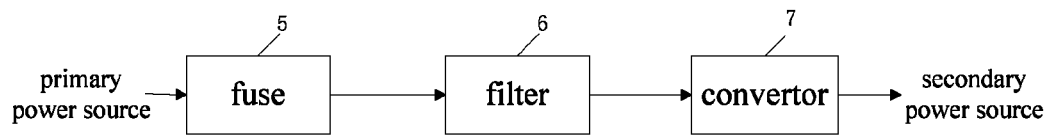
FIG. 1 is a block diagram of a secondary power system in the prior art.
Figure 2:
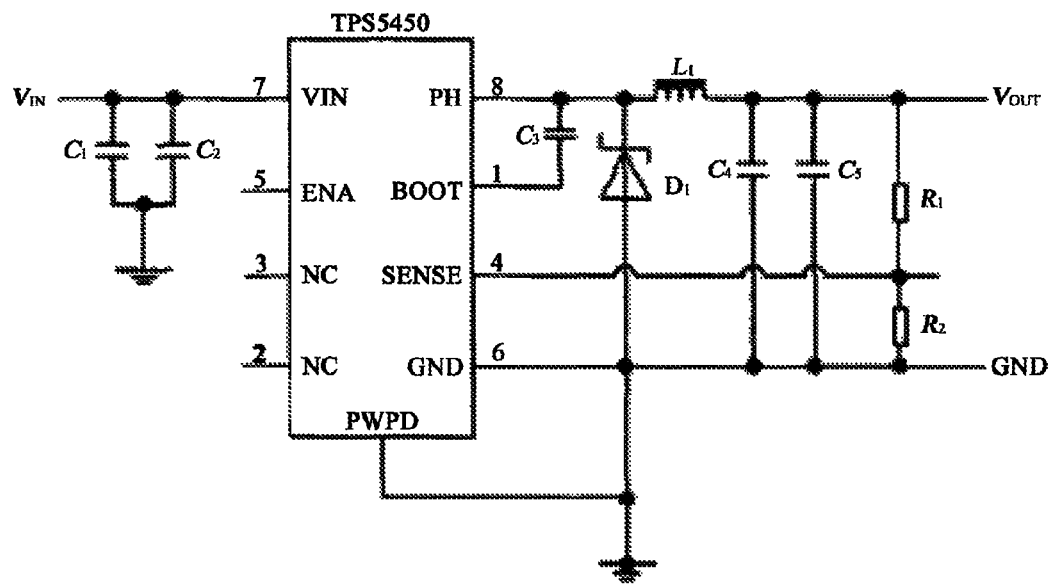
FIG. 2 is a circuit diagram of the convertor in FIG. 1.

Due to the setting of the over-voltage and under-voltage protection circuit 3, in the secondary power system, withstand voltages of some elements (such as the input filter capacitors C1 and C2 of the DC/DC convertor, the power control chip TPS5450, and the like in FIG. 2) in a convertor circuit 4 are greatly decreased, on the premise that the requirements on resistance to over-voltage surge in international standard are satisfied, thus increasing flexibility in selecting elements in the convertor circuit 4 and significantly decreasing volumes of the selectable elements, which not only lowers the cost of the convertor circuit 4, but also saves the space occupied by the convertor circuit 4.

It should be noted that, the load equipment may be any load equipment such as trainborne equipment, shipborne equipment or airborne equipment. In the present embodiment, the load equipment is airborne equipment.

Figure 4:
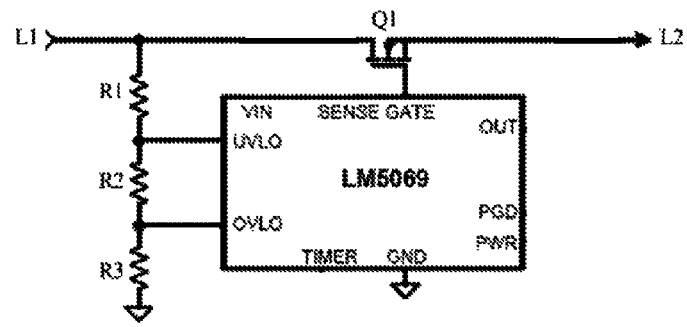
FIG. 4 is a circuit diagram of an over-voltage and under-voltage protection circuit in FIG. 3.

In the present embodiment, as shown in FIGS. 3 and 4, the over-voltage and under-voltage protection circuit 3 comprises an integrated sub-circuit and a peripheral sub-circuit connected with each other, the integrated sub-circuit adopts LM5069. The peripheral sub-circuit comprises a first resistor R1, a second resistor R2, a third resistor R3 and a switch tube Q1 which comprises a gate, a first electrode and a second electrode. The first resistor R1, the second resistor R2 and the third resistor R3 are sequentially connected in series to form a resistor string, a terminal of the first resistor R1 which is not connected in series is a first terminal of the resistor string, the first terminal is connected to an output terminal L1 of the filter circuit 2, a terminal of the third resistor R3 which is not connected in series is a second terminal of the resistor string, and the second terminal is grounded.

An under-voltage lockout pin UVLO of the integrated sub-circuit LM5069 is connected to a connection point between the first resistor R1 and the second resistor R2, an over-voltage lockout pin OVLO of the integrated sub-circuit LM5069 is connected to a connection point between the second resistor R2 and the third resistor R3.

The gate of the switch tube Q1 is connected to a gate driving pin GATE of the integrated sub-circuit LM5069, the first electrode of the switch tube Q1 is connected to the output terminal L1 of the filter circuit 2, and the second electrode of the switch tube Q1 serves as an output terminal L2 of the over-voltage and under-voltage protection circuit 3.

In the present invention, the switch tube Q1 adopts a MOS transistor such as a high side driver NMOS transistor, the first electrode of the switch tube Q1 is a source and the second electrode is a drain, or the first electrode of the switch tube Q1 is a drain, and the second electrode is a source; when a gate-source voltage of the NMOS transistor is smaller than a gate-source threshold voltage, the source and the drain of the NMOS transistor are disconnected; when the gate-source voltage of the NMOS transistor is larger than the gate-source threshold voltage, the source and the drain of the NMOS transistor are connected, and at this time, the source and the drain are of the same voltage.

It should be noted that, the integrated sub-circuit LM5069 is also provided with an OUT pin, a PGD pin, a PWR pin and TIMER pin. Specifically, the TIMER pin is a time delay pin, which is used for delaying a fault (such as an over-voltage or under-voltage failure), and for setting the restart timing of the integrated sub-circuit LM5069. A peripheral display device may be connected between the OUT pin and the PGD pin, and is used to indicate a fault when the integrated sub-circuit LM5069 determines that the fault occurs. The PWR pin is a power limit pin, to which an external resistor may be connected, and is configured to set the allowed maximum power dissipation in conjunction with the external resistor and a fourth resistor Rs (described later) when the primary power source passes through the switch tube Q1. The above pins of the integrated sub-circuit LM5069 may be connected with corresponding peripheral circuits when required. In the present embodiment, the above pins may not be used, and therefore, specific description about these pins will not be given.

Here, the highest voltage that the integrated sub-circuit LM5069 can withstand is 100V, which can ensure that the integrated sub-circuit LM5069 can work safely even when the primary power source generates an over-voltage surge of 80V, thus ensuring that the secondary power system can satisfy the requirements on resistance to over-voltage surge in the Standard GJB181-86 (international standard for airborne equipment).

In the present embodiment, an over-voltage threshold $U_{OVL}$ of the over-voltage and under-voltage protection circuit 3 may be calculated according to the following formula:

$$U_{OVL}=[(R1-R2)\times(2.5V/R3-21 \mu A)]+2.5V,$$

And an under-voltage threshold $U_{UVH}$ of the over-voltage and under-voltage protection circuit 3 may be calculated according to the following formula:

$$U_{UVH}=2.5V+[R1\times(21 \mu A+2.5V/(R2+R3))],$$

wherein, R1 is the resistance of the first resistor, R2 is the resistance of the second resistor, R3 is the resistance of the third resistor, and in calculation, all units of the first, second and third resistors are KΩ.

It should be noted that the above over-voltage threshold $U_{OVL}$ and under-voltage threshold $U_{UVH}$ are represented by the thresholds set inside the integrated sub-circuit LM5069, and also reflect the thresholds of the secondary power system.

Preferably, the resistances of the first resistor, the second resistor and the third resistor are all adjustable. It can thus be seen that, the over-voltage threshold $U_{OVL}$ and the under-voltage threshold $U_{UVH}$ of the secondary power system may be adjusted freely, so as to satisfy requirement of normal operation of the subsequent convertor circuit 4, which enables the secondary power system to supply power to the airborne equipment more safely and normally.

Thereinafter, a specific working process of the over-voltage and under-voltage protection circuit 3 in FIG. 4 is described by taking a case that the primary power source generates an over-voltage surge as an example. When an over-voltage surge occurs in the DC power supplied from the primary power source, after being divided by the first, second and third resistors R1, R2 and R3, a voltage applied to the over-voltage lockout pin OVLO of the integrated sub-circuit LM5069 is higher than the over-voltage threshold set inside the integrated sub-circuit LM5069 (i.e. the over-voltage threshold $U_{OVL}$ of the secondary power system), the gate driving pin GATE of the integrated sub-circuit LM5069 outputs a low level, the gate-source voltage $U_{GS}$ of the switch tube Q1 is lower than the gate-source threshold voltage $U_{GS(th)}$, at this point, the switch tube Q1 is turned off, and power supplied the convertor circuit 4 is cut off, thus preventing the convertor circuit 4 from being impaired by the over-voltage, and further ensuring safety of the convertor circuit 4 and a subsequent load circuit. When the DC power supplied from the primary power source is normal, after being divided by the first, second and third resistors R1, R2 and R3, a voltage applied to the over-voltage lockout pin OVLO of the integrated sub-circuit LM5069 is lower than the over-voltage threshold set inside the integrated sub-circuit LM5069 (i.e. the over-voltage threshold $U_{OVL}$ of the secondary power system), the gate driving pin GATE of the integrated sub-circuit LM5069 outputs a high level, the gate-source voltage $U_{GS}$ of the switch tube Q1 is higher than the gate-source threshold voltage $U_{GS(th)}$, at this point, the switch tube Q1 is turned on, and for a high side driver NMOS transistor, the source and the drain are of the same voltage, which can ensure that output voltage from the output terminal L2 of the over-voltage and under-voltage protection circuit 3 is equal to output voltage from the output terminal L1 of the filter circuit 2, thus ensuring that the convertor circuit 4 subsequently connected to the over-voltage and under-voltage protection circuit 3 can work normally and further the secondary power system can supply power to the airborne equipment normally.

Similarly, when an under-voltage (i.e., insufficient voltage) occurs in the DC power supplied from the primary power source, after being divided by the first, second and third resistors R1, R2 and R3, a voltage applied to the under-voltage lockout pin UVLO of the integrated sub-circuit LM5069 is lower than the under-voltage threshold set inside the integrated sub-circuit LM5069 (i.e. the under-voltage threshold $U_{UVH}$ of the secondary power system), the gate driving pin GATE of the integrated sub-circuit LM5069 outputs a low level, the gate-source voltage $U_{GS}$ of the switch tube Q1 is lower than the gate-source threshold voltage $U_{GS(th)}$, at this point, the switch tube Q1 is turned off, and power supplied to the convertor circuit 4 is cut off, thus preventing the convertor circuit 4 from being impaired by the under-voltage, and further ensuring safety of the convertor circuit 4 and a subsequent load circuit.

It should be noted that, the integrated sub-circuit may adopt any integrated sub-circuit, which can achieve the above over-voltage and under-voltage protection function, other than LM5069. The integrated sub-circuits that can be used in the present invention will not be listed one by one here.

In the present embodiment, a nominal fusing current of the fuse circuit 1 is twice as large as a nominal working current of a latter-stage circuit connected to the output terminal thereof. Such configuration can broaden the input range of the secondary power system, and meanwhile can better satisfy the need of broadening power failure range to avoid over step tripping. Here, the fuse circuit 1 may select a fuse of any type, such as cylindrical fuse, blade contact fuse, screw type fuse, fast acting fuse, or the like, and the selection of a specific type may be determined according to the type of load in the secondary power system.

Figure 5:
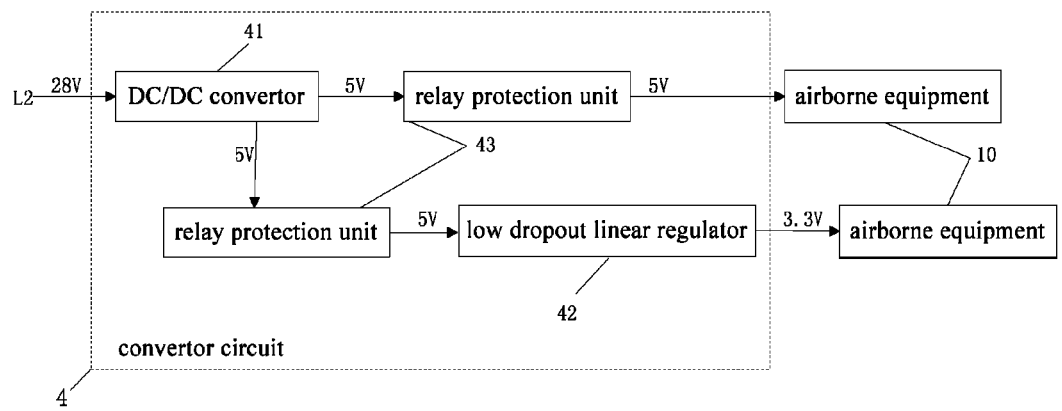
FIG. 5 is a block diagram of the convertor circuit in FIG. 3.

In the present embodiment, as shown in FIGS. 3 to 5, the convertor circuit 4 comprises a DC/DC convertor 41, the primary power source is used for providing 28V DC power, and the DC/DC convertor 41 is used for converting the 28V DC power into 12V DC power or 5V DC power. Here, the DC/DC convertor 41 uses potting encapsulation, this encapsulation type can improve both heat dissipation and structural strength of the DC/DC convertor 41, thus improving reliability of the secondary power system.

In addition, the convertor circuit 4 further comprises a low dropout linear regulator 42, which is connected in series with the DC/DC convertor 41, and is used for converting the 5V DC power into 3.3V DC power or 1.5V DC power. The low dropout linear regulator 42 has low cost, low noise, small quiescent current and high efficiency, and therefore, can implement voltage conversion with low dropout very well.

In the present embodiment, the convertor circuit 4 further comprises one or more relay protection units 43, which is/are connected in series between the DC/DC convertor 41 and the airborne equipment 10, and/or connected in series between the DC/DC convertor 41 and the low dropout linear regulator 42. A plurality of relay protection units 43 may be provided in the convertor circuit 4, so as to protect a plurality of loads (such as an airborne camera and a data processing module), respectively, for example, when an overcurrent occurs to a certain load due to short circuit, the relay protection unit 43 can cut off power supply to said load in time, so as to avoid the short circuit from impairing said load and other loads.

Embodiment 2

Figure 6:
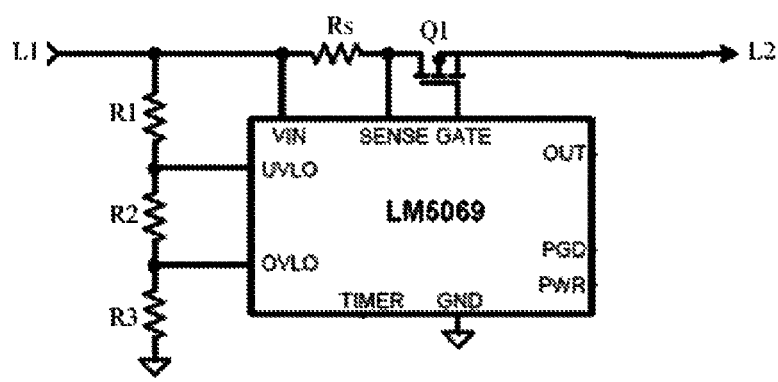
FIG. 6 is a circuit diagram of an over-voltage and under-voltage protection circuit in Embodiment 2 of the present invention.

The present embodiment provides a secondary power system, which differs from the secondary power system in Embodiment 1 in that, as shown in FIG. 6, the peripheral sub-circuit further comprises a fourth resistor Rs, a first terminal of the fourth resistor Rs is connected to the output terminal L1 of the filter circuit and the power input pin VIN of the integrated sub-circuit LM5069, and a second terminal of the fourth resistor Rs is connected to the first electrode of the switch tube Q1 and the current sense pin SENSE of the integrated sub-circuit LM5069.

The fourth resistor Rs enables the over-voltage and under-voltage protection circuit to cut off power supplied to its latter-stage circuit when an overcurrent occurs in the latter-stage circuit connected to the over-voltage and under-voltage protection circuit due to short circuit or other reason, thus protecting the latter-stage circuit from being impaired.

It should be noted that, the resistance of the fourth resistor Rs remains unchanged, when a current passing through the fourth resistor Rs increases to cause a voltage drop across the fourth resistor Rs to reach a certain set value, the integrated sub-circuit LM5069 determines that an overcurrent occurs in the latter-stage circuit of the over-voltage and under-voltage protection circuit, and at this time, the switch tube Q1 is turned off, and thus cutting off power supplied to the latter-stage circuit.

Other structures of the secondary power system provided by the present embodiment are the same as those in Embodiment 1, and are not repeated herein.

Beneficial effects of Embodiments 1 and 2 are as follows: the secondary power system provided by Embodiment 1 or 2, by providing an over-voltage and under-voltage protection circuit, can greatly decrease withstand voltages of some elements in a convertor circuit, on the premise that the requirements on resistance to over-voltage surge in international standard are satisfied, thus increasing flexibility in selecting elements in the convertor circuit and significantly decreasing volumes of the selectable elements, which not only lowers the cost of the convertor circuit, but also saves the space occupied by the convertor circuit.

Embodiment 3

The present embodiment provides a power supply device, which is used for supplying power for a load equipment, and comprises the secondary power system provided by any one of Embodiments 1 and 2.

The power supply device provided by the present embodiment can not only lower the cost of the power supply device, but also save the space occupied by the power supply device by using the secondary power system provided by any one of Embodiments 1 and 2.

It should be understood that, the above implementations are only exemplary embodiments for the purpose of explaining the principle of the present invention, but the present invention is not limited thereto. For a person skilled in the art, various improvements and modifications may be made without departing from the spirit and essence of the present invention. These improvements and modifications are also deemed as the protection scope of the present invention.

What is claimed is:

1. A secondary power system, which is used for supplying power for a load equipment, and comprises: a fuse circuit, a filter circuit, a convertor circuit and an over-voltage and under-voltage protection circuit, the fuse circuit, the filter circuit, the over-voltage and under-voltage protection circuit and the convertor circuit being sequentially connected in series; wherein, an input terminal of the fuse circuit is configured to be electrically connected to a primary power source, and the fuse circuit is capable of cutting off power supplied to a latter-stage circuit connected to an output terminal of the fuse circuit when an overcurrent occurs in the primary power source or the latter-stage circuit;

the filter circuit is configured to suppress influence on the secondary power system caused by noise of the primary power source, and to prevent interference generated by the secondary power system from entering the primary power source at the same time;

the over-voltage and under-voltage protection circuit is configured to cut off power supplied to the convertor circuit when power supplied by the primary power source is an under-voltage or over-voltage; and the convertor circuit is configured to convert a voltage provided by the primary power source into a voltage of a secondary power source required by the load equipment.

2. The secondary power system of claim 1, wherein, the over-voltage and under-voltage protection circuit comprises an integrated sub-circuit and a peripheral sub-circuit connected with each other, the integrated sub-circuit comprises an over-voltage lockout pin, a under-voltage lockout pin and a gate driving pin, and the peripheral sub-circuit comprises a first resistor, a second resistor, a third resistor and a switch tube comprising a gate, a first electrode and a second electrode;

the first resistor, the second resistor and the third resistor are sequentially connected in series to form a resistor string, a terminal of the first resistor which is not connected in series is a first terminal of the resistor string, the first terminal is connected to an output terminal of the filter circuit, a terminal of the third resistor which is not connected in series is a second terminal of the resistor string, and the second terminal is grounded;

the under-voltage lockout pin of the integrated sub-circuit is connected to a connection point between the first resistor and the second resistor, the over-voltage lockout pin of the integrated sub-circuit is connected to a connection point between the second resistor and the third resistor; and the gate of the switch tube is connected to the gate driving pin of the integrated sub-circuit, the first electrode of the switch tube is connected to the output terminal of the filter circuit, and the second electrode of the switch tube serves as an output terminal of the over-voltage and under-voltage protection circuit.

3. The secondary power system of claim 2, wherein, an over-voltage threshold $U_{OVL}$ of the secondary power system is calculated according to the following formula:

$$U_{OVL}=[(R1-R2)\times(2.5V/R3-21\ \mu A)]+2.5V,$$

and an under-voltage threshold $U_{UVH}$ of the secondary power system is calculated according to the following formula:

$$U_{UVH}=2.5V+[R1\times(21\ \mu A+2.5V/(R2+R3))],$$

wherein, R1 is the resistance of the first resistor, R2 is the resistance of the second resistor, R3 is the resistance of the third resistor, and the resistances of the first resistor, the second resistor and the third resistor are all adjustable.

4. The secondary power system of claim 2, wherein, the peripheral sub-circuit further comprises a fourth resistor, the integrated sub-circuit further comprises a power input pin and a current sense pin, a first terminal of the fourth resistor is connected to the output terminal of the filter circuit and the power input pin of the integrated sub-circuit, and a second terminal of the fourth resistor is connected to the first electrode of the switch tube and the current sense pin of the integrated sub-circuit.

5. The secondary power system of claim 2, wherein, the switch tube is a MOS transistor, and the integrated sub-circuit includes LM5069.

6. The secondary power system of claim 1, wherein, a nominal fusing current of the fuse circuit is twice as large as a nominal working current of the latter-stage circuit connected to the output terminal of the fuse circuit.

7. The secondary power system of claim 1, wherein, the convertor circuit comprises a DC/DC convertor, the primary power source is used for providing 28V DC power, and the DC/DC convertor is configured to convert the 28V DC power into 12V DC power and/or 5V DC power.

8. The secondary power system of claim 7, wherein, the DC/DC convertor uses potting encapsulation.

9. The secondary power system of claim 7, wherein, the convertor circuit further comprises a low dropout linear regulator, which is connected in series with the DC/DC convertor, and is configured to convert the 5V DC power into 3.3V DC power and/or 1.5V DC power.

10. The secondary power system of claim 7, wherein, the convertor circuit further comprises at least one relay protection unit, which is connected in series between the DC/DC convertor and the load equipment, and/or, connected in series between the DC/DC convertor and the low dropout linear regulator.

11. A power supply device, which is used for supplying power for a load equipment, and comprises a secondary power system, which comprises: a fuse circuit, a filter circuit, a convertor circuit and an over-voltage and under-voltage protection circuit, wherein, the fuse circuit, the filter circuit, the over-voltage and under-voltage protection circuit and the convertor circuit are sequentially connected in series;

an input terminal of the fuse circuit is configured to be electrically connected to a primary power source, and the fuse circuit is capable of cutting off power supplied to a latter-stage circuit connected to an output terminal of the fuse circuit when an overcurrent occurs in the primary power source or the latter-stage circuit;

the filter circuit is configured to suppress influence on the secondary power system caused by noise of the primary power source, and to prevent interference generated by the secondary power system from entering the primary power source at the same time;

the over-voltage and under-voltage protection circuit is configured to cut off power supplied to the convertor circuit when power supplied by the primary power source is an under-voltage or over-voltage; and the convertor circuit is configured to convert a voltage provided by the primary power source into a voltage of a secondary power source required by the load equipment.

12. The power supply device of claim 11, wherein, the over-voltage and under-voltage protection circuit comprises an integrated sub-circuit and a peripheral sub-circuit connected with each other, the integrated sub-circuit comprises an over-voltage lockout pin, a under-voltage lockout pin and a gate driving pin, and the peripheral sub-circuit comprises a first resistor, a second resistor, a third resistor and a switch tube comprising a gate, a first electrode and a second electrode;

the first resistor, the second resistor and the third resistor are sequentially connected in series to form a resistor string, a terminal of the first resistor which is not connected in series is a first terminal of the resistor string, the first terminal is connected to an output terminal of the filter circuit, a terminal of the third resistor which is not connected in series is a second terminal of the resistor string, and the second terminal is grounded;

the under-voltage lockout pin of the integrated sub-circuit is connected to a connection point between the first resistor and the second resistor, the over-voltage lockout pin of the integrated sub-circuit is connected to a connection point between the second resistor and the third resistor; and the gate of the switch tube is connected to the gate driving pin of the integrated sub-circuit, the first electrode of the switch tube is connected to the output terminal of the filter circuit, and the second electrode of the switch tube serves as an output terminal of the over-voltage and under-voltage protection circuit.

13. The power supply device of claim 12, wherein, an over-voltage threshold $U_{OVL}$ of the secondary power system is calculated according to the following formula:

$$U_{OVL}=[(R1-R2)\times(2.5V/R3-21\ \mu A)]+2.5V,$$

and an under-voltage threshold $U_{UVH}$ of the secondary power system is calculated according to the following formula:

$$U_{UVH}=2.5V+[R1\times(21\ \mu A+2.5V/(R2+R3))],$$

wherein, R1 is the resistance of the first resistor, R2 is the resistance of the second resistor, R3 is the resistance of the third resistor, and the resistances of the first resistor, the second resistor and the third resistor are all adjustable.

14. The power supply device of claim 12, wherein, the peripheral sub-circuit further comprises a fourth resistor, the integrated sub-circuit further comprises a power input pin and a current sense pin, a first terminal of the fourth resistor is connected to the output terminal of the filter circuit and the power input pin of the integrated sub-circuit, and a second terminal of the fourth resistor is connected to the first electrode of the switch tube and the current sense pin of the integrated sub-circuit.

15. The power supply device of claim 12, wherein, the switch tube is a MOS transistor, and the integrated sub-circuit includes LM5069.

16. The power supply device of claim 11, wherein, a nominal fusing current of the fuse circuit is twice as large as a nominal working current of the latter-stage circuit connected to the output terminal of the fuse circuit.

17. The power supply device of claim 11, wherein, the convertor circuit comprises a DC/DC convertor, the primary power source is used for providing 28V DC power, and the DC/DC convertor is configured to convert the 28V DC power into 12V DC power and/or 5V DC power.

18. The power supply device of claim 17, wherein, the DC/DC convertor uses potting encapsulation.

19. The power supply device of claim 17, wherein, the convertor circuit further comprises a low dropout linear regulator, which is connected in series with the DC/DC convertor, and is configured to convert the 5V DC power into 3.3V DC power and/or 1.5V DC power.

20. The power supply device of claim 17, wherein, the convertor circuit further comprises at least one relay protection unit, which is connected in series between the DC/DC convertor and the load equipment, and/or, connected in series between the DC/DC convertor and the low dropout linear regulator.

* * * * *